United States Patent [19]

Noguchi

[11] Patent Number: 4,974,943
[45] Date of Patent: Dec. 4, 1990

[54] LIGHT BEAM SCANNING APPARATUS

[75] Inventor: Masaru Noguchi, Kanagawa, Japan

[73] Assignee: Fuji Photo Film Co., Ltd., Kanagawa, Japan

[21] Appl. No.: 718,049

[22] Filed: Mar. 29, 1985

[30] Foreign Application Priority Data

Mar. 30, 1984 [JP] Japan .................................. 59-60831

[51] Int. Cl.⁵ ................................................ G02F 1/33
[52] U.S. Cl. ...................................... 350/358; 350/353
[58] Field of Search ................................ 350/358, 353

[56] References Cited

U.S. PATENT DOCUMENTS

| | | | |
|---|---|---|---|
| 3,492,063 | 1/1970 | Lee . | |
| 3,634,749 | 1/1972 | Montgomery | 350/358 |
| 3,799,652 | 3/1974 | Torguet . | |
| 4,164,717 | 8/1979 | Blazey | 350/358 |
| 4,243,293 | 1/1981 | Kramer | 350/3.71 |
| 4,400,063 | 8/1983 | Hayashida | 350/6.8 |
| 4,443,066 | 4/1984 | Freyre . | |

FOREIGN PATENT DOCUMENTS

| | | | |
|---|---|---|---|
| 2210320 | 9/1972 | Fed. Rep. of Germany . | |
| 57-164718 | 10/1982 | Japan | 350/358 |
| 2069167 | 8/1981 | United Kingdom . | |

*Primary Examiner*—Bruce Y. Arnold
*Assistant Examiner*—Terry S. Callaghan
*Attorney, Agent, or Firm*—Sughrue, Mion, Zinn, MacPeak & Seas

[57] ABSTRACT

A light beam scanning apparatus comprises an ultrasonic light deflector for diffracting a light beam of a predetermined wavelength, and a reflecting mirror positioned approximately normal to light deflected by the ultrasonic light deflector for reflecting the deflected light and making it again impinge upon the ultrasonic light deflector.

3 Claims, 2 Drawing Sheets

LIGHT BEAM SCANNING APPARATUS

BACKGROUND OF THE INVENTION

1. Field of the Invention

This invention relates to a light beam scanning apparatus using an ultrasonic light deflector.

2. Description of the Prior Art

Light beam scanning apparatuses for scanning light having a predetermined wavelength, for example a laser beam, have heretofore been used for writing and reading image information. In the light beam scanning apparatuses, a multi-face rotating mirror, a bimorph mirror, a hologram scanner, and the like are used. However, the light beam scanning apparatuses have the drawback that, since a light reflecting plane or a plane of diffraction is mechanically rotated or swung, the moveable sections are inevitably worn out and it is not always possible to improve durability of the moveable sections. Also, since worn moving sections, particularly worn bearings, cause the reflecting plane or the place of diffraction to deviate, the quality of the written image or the read-out image becomes very low.

Therefore, a need exists for a light deflecting device having no moveable section, and an ultrasonic light deflector, i.e. an acousto-optic deflector (AOD), has been proposed as such light deflecting device. However, the ultrasonic light deflector has the drawback that the light deflection angle is small and the number of the resolution points on one scanning line cannot be increased sufficiently. For this reason, application of the ultrasonic light deflector is strictly limited.

SUMMARY OF THE INVENTION

The primary object of the present invention is to provide a light beam scanning apparatus wherein the deflection angle of an ultrasonic light deflector is increased and the number of the resolution points obtained on one scanning line is increased over the conventional apparatus using the ultrasonic light deflector.

Another object of the present invention is to provide a light beam scanning apparatus having no moveable sections and free from inconsistent operation caused by worn moveable sections.

The light beam scanning apparatus in accordance with the present invention comprises an ultrasonic light deflector for diffracting a light beam of a predetermined wavelength, and a reflecting mirror positioned approximately normal to light deflected by said ultrasonic light deflector for reflecting said deflected light and making it again impinge upon said ultrasonic light deflector.

The number of diffractions repeated by the ultrasonic light deflector is not limited to two, and a plurality of the reflecting mirrors may be positioned for diffracting the light three times or more, thereby further increasing the deflection angle.

In the present invention, since the reflecting mirror is positioned approximately normal to the deflected light passing through the ultrasonic light deflector so that the light is diffracted two or more times by the ultrasonic light deflector, it is possible to increase the deflection angle. Accordingly, the number of the resolution points obtained on one scanning line is markedly increased, and the image quality in image writing and reading is markedly improved. Further, since no mechanical moveable sections are used and no consideration for worn-out during operations is needed, the durability of the light beam scanning apparatus of the present invention is excellent, and it is possible to realize consistent and accurate scanning operations.

DESCRIPTION OF THE PREFERRED EMBODIMENTS

The present invention will hereinbelow be described in further detail with reference to the accompanying drawings.

Figure 1:
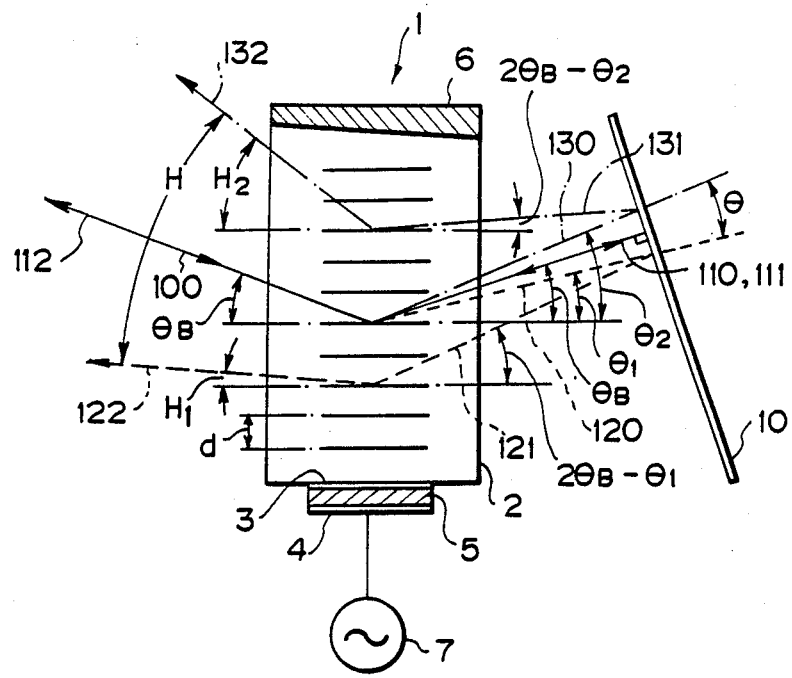
FIGS. 1 and 2 are explanatory views showing the principle of the light beam scanning apparatus in accordance with the present invention.
Figure 2:
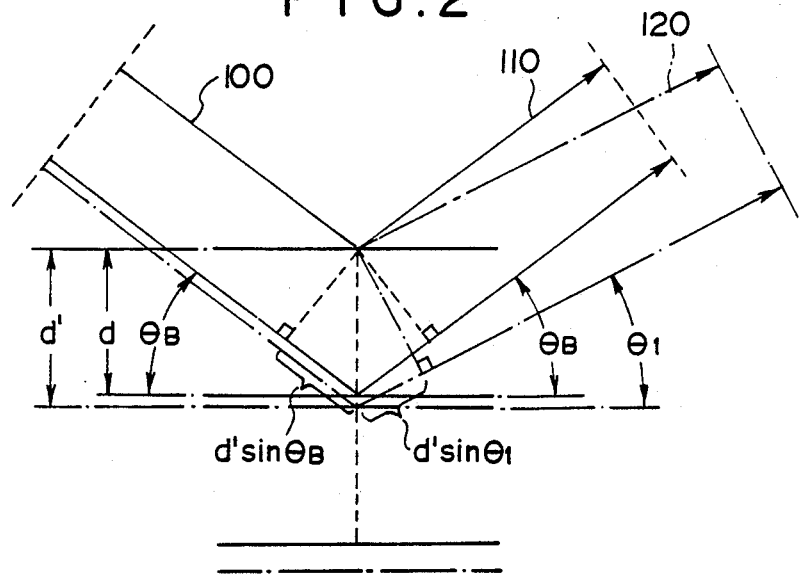

FIGS. 1 and 2 show the principle of the light beam scanning apparatus in accordance with the present invention. In FIG. 1, an ultrasonic light deflector 1 comprises a deflecting medium 2 fabricated of a crystal such as $TeO_2$ or $PbMoO_4$, or glass, a piezo-electric vibrator 5 sandwiched by electrodes 3 and 4 and closely contacted with one end face of the deflecting medium 2 via the electrode 3, an ultrasonic wave absorber 6 closely contacted with the other end face of the deflecting medium 2, and an oscillator 7 for applying an electric signal to the piezo-electric vibrator 5.

When the oscillator 7 applies an electric signal of a predetermined frequency to the piezo-electric vibrator 5, ultrasonic vibrations of the piezo-electric vibrator 5 are propagated through the deflecting medium 2 towards the ultrasonic wave absorber 6 which is disposed at the other end of the deflecting medium 2, and there arises a periodic change in refractive index identical with the wavelength intervals of the ultrasonic wave. The periodic change in refractive index acts as a diffraction grating.

When incident light consisting of plane wave (100) impinges upon the deflecting medium 2 at an angle $\theta B$ satisfying the Bragg condition, there holds the formula $$2\sin\theta B = \lambda \qquad (1)$$

where d designates the wavelength of ultrasonic waves, and $\lambda$ designates the wavelength of the incident light (100).

As shown in FIG. 2, when the ultrasonic frequency is decreased and the wavelength d is increased to d', deflected light (120) is diffracted at an angle $\theta 1$ in the direction satisfying the condition $$d'(\sin\theta B + \sin + 1) = \lambda \qquad (2)$$

That is, when the ultrasonic frequency is decreased, the exit angle of the diffracted light (120) changes from $\theta B$ to $\theta 1$.

By way of example, the deflecting medium 2 is fabricated of $TeO_2$ and is operated in transverse wave mode. When the speed of ultrasonic waves is V=617 m/sec., and a center frequency of ultrasonic wave of fc=75 MHz is modulated by 25 MHz to f1=50 MHz and f2=100 MHz, wavelengths dc, d1 and d2 of ultrasonic waves corresponding to the ultrasonic frequencies fc, f1 and f2 are $$dc = \frac{V}{fc} = 8.2 \ \mu m$$

$$d_1 = \frac{V}{f_1} = 12.3 \ \mu m$$

$$d_2 = \frac{V}{f_2} = 6.2 \ \mu m.$$

When a He-Ne laser beam having a wavelength of $\lambda = 0.633$ um is used as the incident light (100), the Bragg angle $\theta B$ at the center frequency fc is calculated from Formula (1) by $$\theta_B = \sin^{-1}\left(\frac{\lambda}{2dc}\right) = 0.0386 \text{(rad)}.$$

When the angle of incidence is maintained at $\theta B$ and the ultrasonic frequency is modulated to f1 and f2, substitution of d1 and d2 into d' of Formula (2) gives the exit angles $\theta 1$ and $\theta 2$ of deflected light (120) and deflected light (130) as $$\theta_1 = \sin^{-1}\left[\frac{\lambda}{d_1} - \sin \theta_B\right] = 0.0129 \text{(rad)}$$

$$\theta_2 = \sin^{-1}\left[\frac{\lambda}{d_2} - \sin \theta_B\right] = 0.0635 \text{(rad)}.$$

That is, the deflection angle $\theta$ at this time is $$\theta = \theta_2 - \theta_1 = 0.0506 \text{(rad)}.$$

Therefore, deflection by approximately 50 mrad becomes possible.

A reflecting mirror 10 is positioned normal to the center deflected light (110) on the deflected light (110) side of the ultrasonic light deflector 1. In this case, when the ultrasonic frequency is adjusted to the center frequency fc, the center deflected light (110) is reflected by the reflecting mirror 10 as re-incident light (111) which returns along the same path as the incident light (100). When the ultrasonic frequency is adjusted to f1 and f2, the angles of incidence of re-incident light (121) and re-incident light (131) are $$2\theta_B - \theta_1 = 0.0643 \text{(rad)}$$

$$2\theta_B - \theta_2 = 0.0137 \text{(rad)}.$$

Therefore, deflection angles ⒽⒸ1 and ⒽⒸ2 of re-deflected light (122) and re-deflected light (132) in the respective cases are calculated from Formula (2) by $$Ⓗ_1 = \sin^{-1}\left[\frac{\lambda}{d_1} - \sin(2\theta_B - \theta_1)\right] = -0.0128 \text{(rad)}$$

$$Ⓗ_2 = \sin^{-1}\left[\frac{\lambda}{d_2} - \sin(2\theta_B - \theta_2)\right] = 0.0884 \text{(rad)}.$$

Accordingly, the deflection angle Ⓗ of redeflected light (122), (132) is $$Ⓗ = Ⓗ_2 - Ⓗ_1 = 0.101 \text{(rad)} \approx 2\theta.$$

That is, by positioning the reflecting mirror 10 as described above, the deflection angle is approximately doubled.

Figure 3:
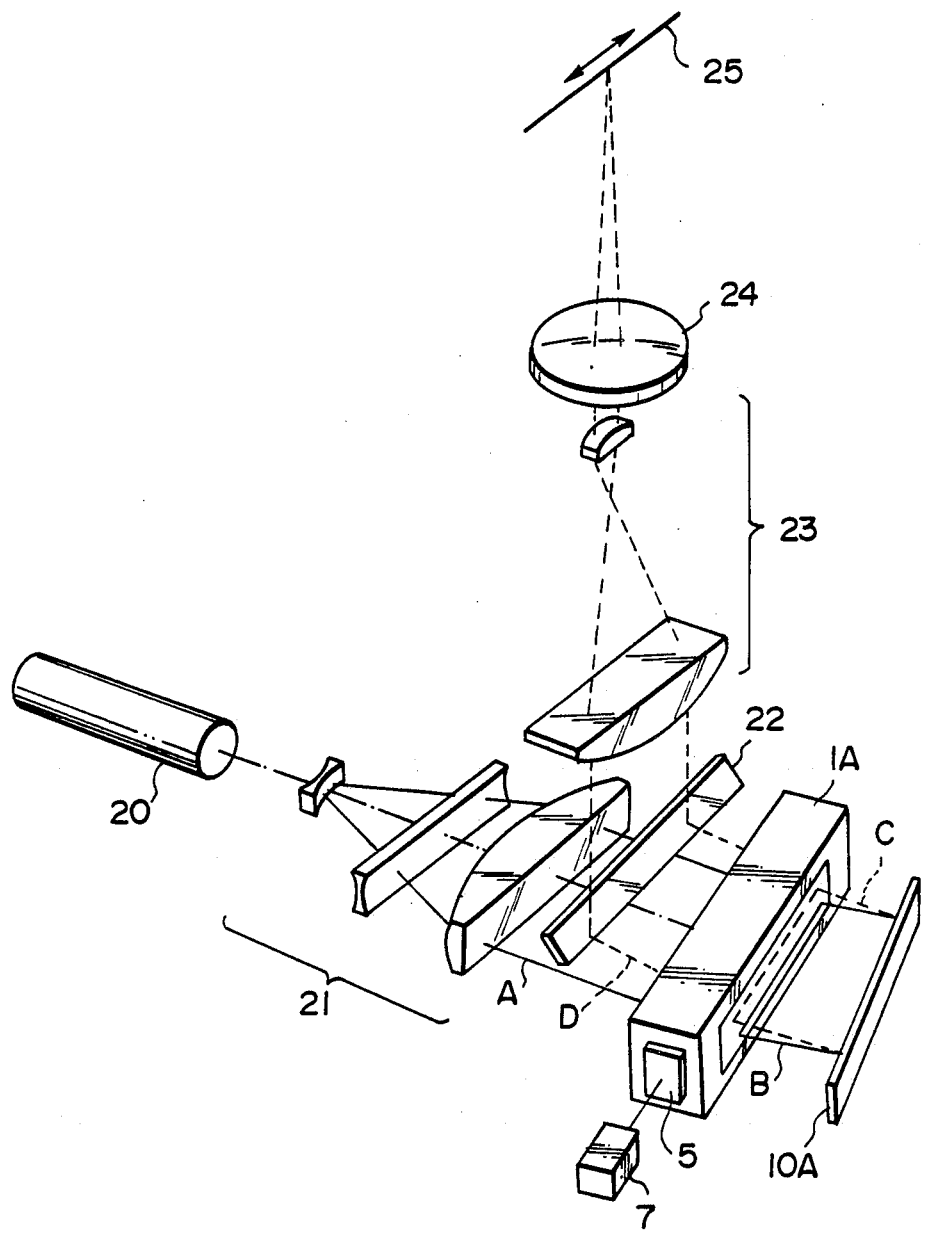
FIG. 3 is a perspective view showing an embodiment of the light beam scanning apparatus in accordance with the present invention.

FIG. 3 shows an embodiment of the light beam scanning apparatus in accordance with the present invention, which is constituted on the basis of the above-mentioned principle. An ultrasonic light deflector 1A has longitudinally elongated inlet and exit windows. A laser beam emitted by a laser beam source 20 is converted by an optical system 21 into flat plane incident light A which impinges upon the ultrasonic light deflector 1A. Light B deflected by the ultrasonic light deflector 1A is reflected by an elongated reflecting mirror 10A to form re-incident light C which again impinges upon the ultrasonic light deflector 1A and is again deflected thereby to form re-deflected light D. In FIG. 1, the reflecting mirror 10 is positioned normal to the center deflected light (110). However, in this case, it is not easy to separate the incident light (100) from the re-deflected light (122), (132). Therefore, in the embodiment of FIG. 3, the incident light A and the re-deflected light D are vertically separated from each other by slightly inclining the reflecting mirror 10A so that it is not normal to the plane on which the incident light A and the deflected light B lie. The re-deflected light D impinges upon a reflecting mirror 22, passes through a beam shaping optical system 23 and an f$\theta$ lens 24, and then forms a spot-like image on a scanning line 25. On the basis of the above-mentioned principle, when the frequency of the oscillator 7 is changed, the deflection angle of the re-deflected light D is changed on the plane of the re-deflected light D, and the spot-like image formed by the re-deflected light D is scanned on the scanning line 25.

In the aforesaid embodiment, the incident light A reciprocates only once through the ultrasonic light deflector 1A. However, the present invention is not limited to this embodiment. For example, it is also possible to position reflecting mirror on both sides of the ultrasonic light deflector 1A so that the light is deflected three times or more by the ultrasonic light deflector 1A. In this case, the deflection angle is further increased.

I claim:

1. A light beam scanning apparatus comprising an ultrasonic light deflector for diffracting a light beam of a predetermined wavelength, and a reflecting mirror positioned approximately normal to the center of light deflected by said ultrasonic light deflector for reflecting said deflected light and making it again impinge upon said ultrasonic light deflector, wherein said ultrasonic light deflector is provided with longitudinally elongated inlet and exit windows, and an optical system for converting said light beam into flat plane incident light is provided in front of said ultrasonic light deflector.

2. An apparatus as defined in claim 1 wherein a plurality o said reflecting mirrors are positioned with said ultrasonic light deflector interposed therebetween.

3. An apparatus as defined in claim 1 wherein a reflecting mirror, a beam shaping optical system and an f$\theta$ lens for converting re-deflected light into a spot-like image formed on a scanning line are positioned on the inlet window side of said ultrasonic light deflector.

* * * * *